United States Patent
Hyoudou

(10) Patent No.: US 10,791,061 B2
(45) Date of Patent: Sep. 29, 2020

(54) COMMUNICATION CONTROL DEVICE AND COMMUNICATION CONTROL METHOD

(71) Applicant: FUJITSU LIMITED, Kawasaki-shi, Kanagawa (JP)

(72) Inventor: Kazuki Hyoudou, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 16/149,793

(22) Filed: Oct. 2, 2018

(65) Prior Publication Data

US 2019/0132252 A1 May 2, 2019

(30) Foreign Application Priority Data

Oct. 31, 2017 (JP) .................. 2017-210990

(51) Int. Cl.
| | |
|---|---|
| *H04L 12/851* | (2013.01) |
| *H04L 12/863* | (2013.01) |
| *G06F 9/455* | (2018.01) |
| *H04L 12/935* | (2013.01) |
| *H04L 12/931* | (2013.01) |

(52) U.S. Cl.
CPC ...... *H04L 47/2483* (2013.01); *G06F 9/45558* (2013.01); *H04L 47/6255* (2013.01); *H04L 49/3027* (2013.01); *H04L 49/70* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,578,050 B1* | 2/2017 | Barabash | H04L 63/20 |
| 2002/0196737 A1* | 12/2002 | Bullard | H04L 41/5058 |
| | | | 370/231 |
| 2014/0283083 A1* | 9/2014 | Gula | H04L 63/1433 |
| | | | 726/25 |
| 2018/0074933 A1* | 3/2018 | Neystadt | G06F 11/0745 |
| 2019/0068502 A1* | 2/2019 | Shiraki | H04L 47/12 |
| 2019/0312816 A1* | 10/2019 | Shen | H04L 47/24 |

FOREIGN PATENT DOCUMENTS

| | | |
|---|---|---|
| JP | 2012-244524 | 12/2012 |
| JP | 2014-086891 | 5/2014 |

\* cited by examiner

*Primary Examiner* — Otis L Thompson, Jr.
(74) *Attorney, Agent, or Firm* — Fujitsu Patent Center

(57) ABSTRACT

A communication control device includes one or more memories configured to store log information indicating an input port through which a packet included in one of flows are inputted, an output port through which the packet is outputted, and time related to input of the packet, and one or more processors coupled to the one or more memories and the one or more processors configured to, on the basis of the log information, perform generation of relation information indicating relations among the flows, and when a first port is in a congested state, identify, in accordance with the relation information, an original flow on which a first flow is based, the first flow regarding a first packet included in an output queue of the first port.

14 Claims, 14 Drawing Sheets

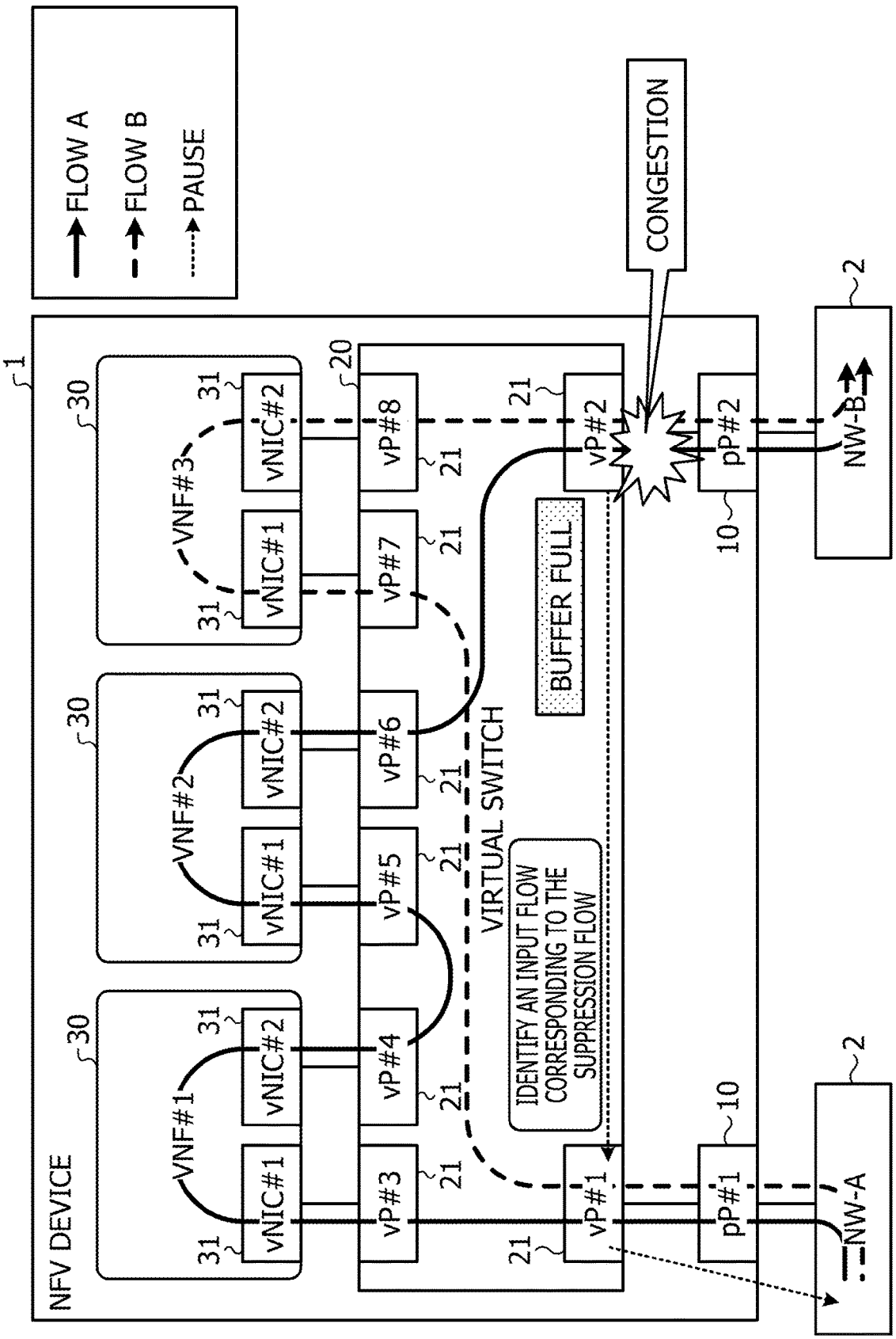

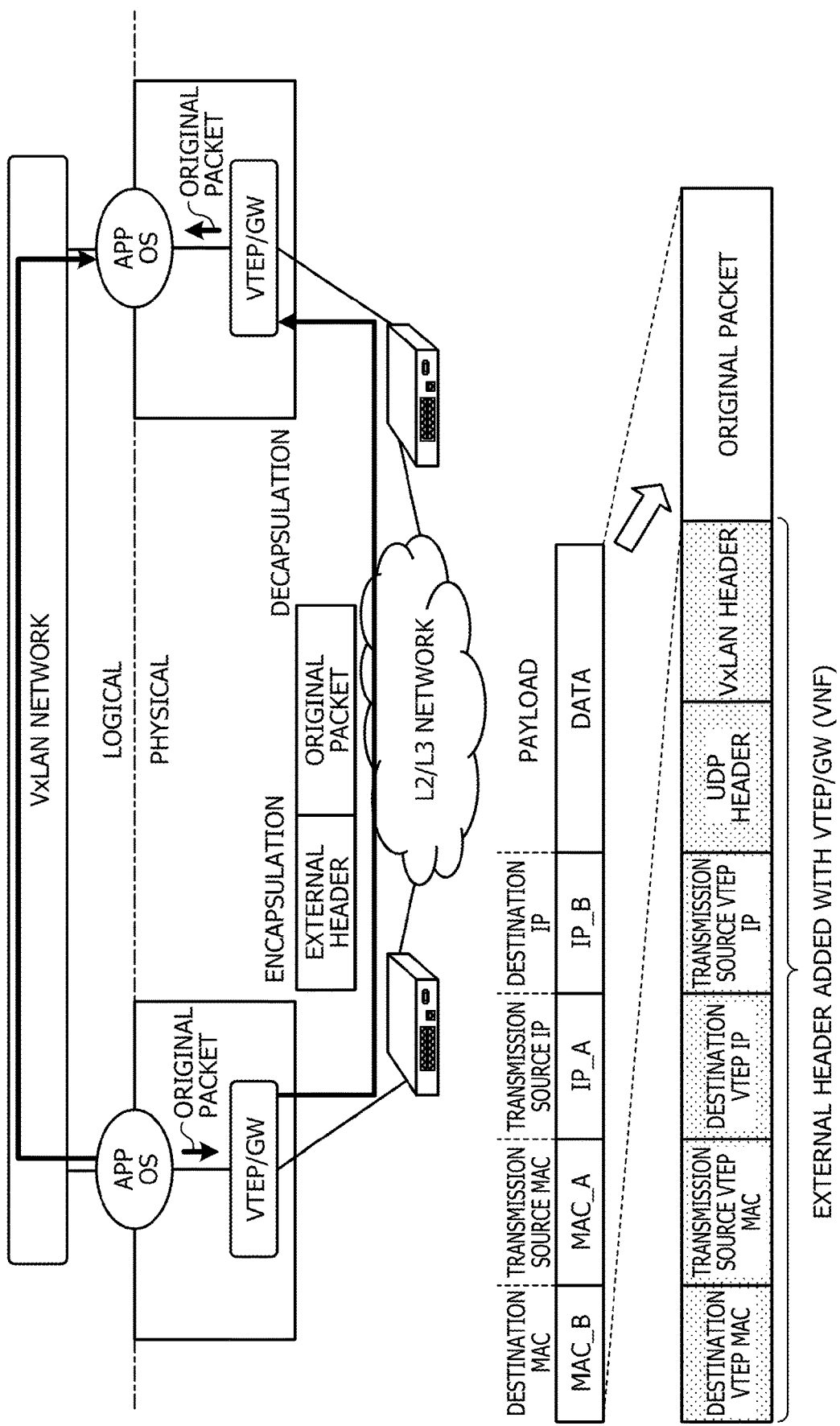

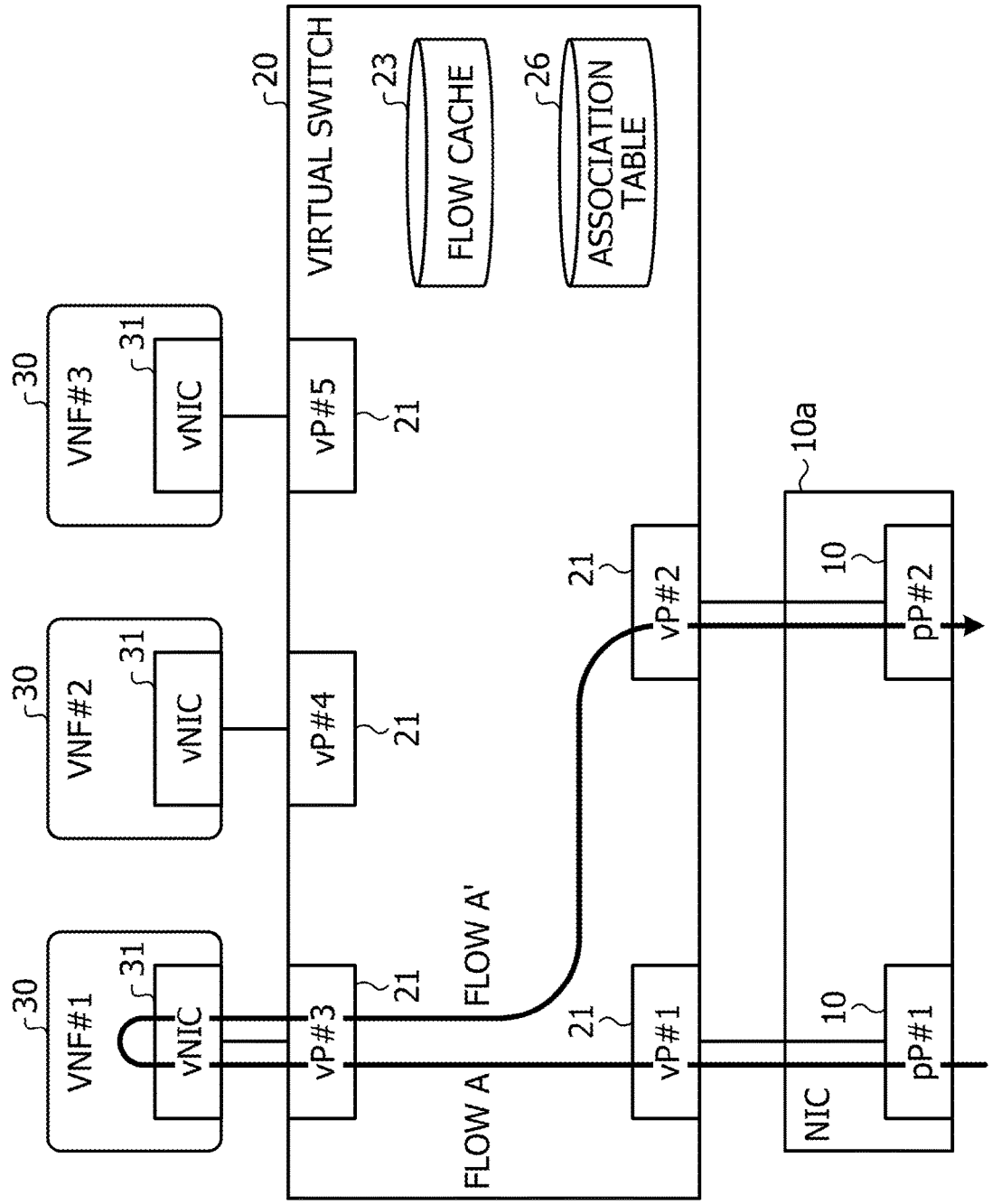

COMMUNICATION CONTROL DEVICE AND COMMUNICATION CONTROL METHOD

CROSS-REFERENCE TO RELATED APPLICATION

This application is based upon and claims the benefit of priority of the prior Japanese Patent Application No. 2017-210990, filed on Oct. 31, 2017, the entire contents of which are incorporated herein by reference.

FIELD

The embodiment discussed herein is related to communication control technology.

BACKGROUND

In recent years, use of network function virtualization (NFV) is becoming widespread. NFV is a technique for implementing the network functions that have been realized by a dedicated device in software installed on a general-purpose information processing apparatus. NFV operates a plurality of virtual network functions (virtual network functions (VNFs)) in a single information processing apparatus using virtualization technology of the information processing apparatus and establishes connections among VNFs, between an external network (NW) and a VNF using a virtual switch, or the like.

A virtual machine (VM) is normally operated as an endpoint of communication. However, when a VNF is operated on a VM, the VNF operates as an intermediate node that processes an input packet group and transmits the packet group to a network again, and thus the communication behavior of the VM on which the VNF is operated differs from the communication behavior of a VM on which an application is operated.

In particular, for example, compared with a VM on which an application is operated, inter-VM (VNF) communications are likely to occur due to a service chain that processes a certain flow by a plurality of VNFs. A flow refers to a packet flow that is identified by a start point of communication and an end point of communication. A start point and an end point of communication are identified, for example, by a combination of an information processing apparatus and an application.

A technique is provided that temporarily stops transmission of a frame to an output port based on a transmission stop instruction received from the other device so as to avoid discarding a frame. Another technique is provided that generates a PAUSE frame (transmission stop instruction), in which a media access control (MAC) address of a virtual machine to perform the bandwidth control of communication to a network is stored, and transmits the PAUSE frame to a virtual machine server on which the virtual machine runs. With this technique, it is possible to contribute to identify a virtual machine aimed at bandwidth control without imposing a high load on the virtual machine server.

For example, related-art techniques are disclosed in Japanese Laid-open Patent Publication Nos. 2012-244524 and 2014-86891.

SUMMARY

According to an aspect of the embodiments, a communication control device includes one or more memories configured to store log information indicating an input port through which a packet included in one of flows are inputted, an output port through which the packet is outputted, and time related to input of the packet, and one or more processors coupled to the one or more memories and the one or more processors configured to, on the basis of the log information, perform generation of relation information indicating relations among the flows, and when a first port is in a congested state, identify, in accordance with the relation information, an original flow on which a first flow is based, the first flow regarding a first packet included in an output queue of the first port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of a transmission suppression instruction by an NFV device according to an embodiment;

FIG. 2B is a diagram illustrating another example of packet conversion in VNF;

FIG. 5A is a diagram illustrating an example of a flow;

DESCRIPTION OF EMBODIMENTS

Figure 12:
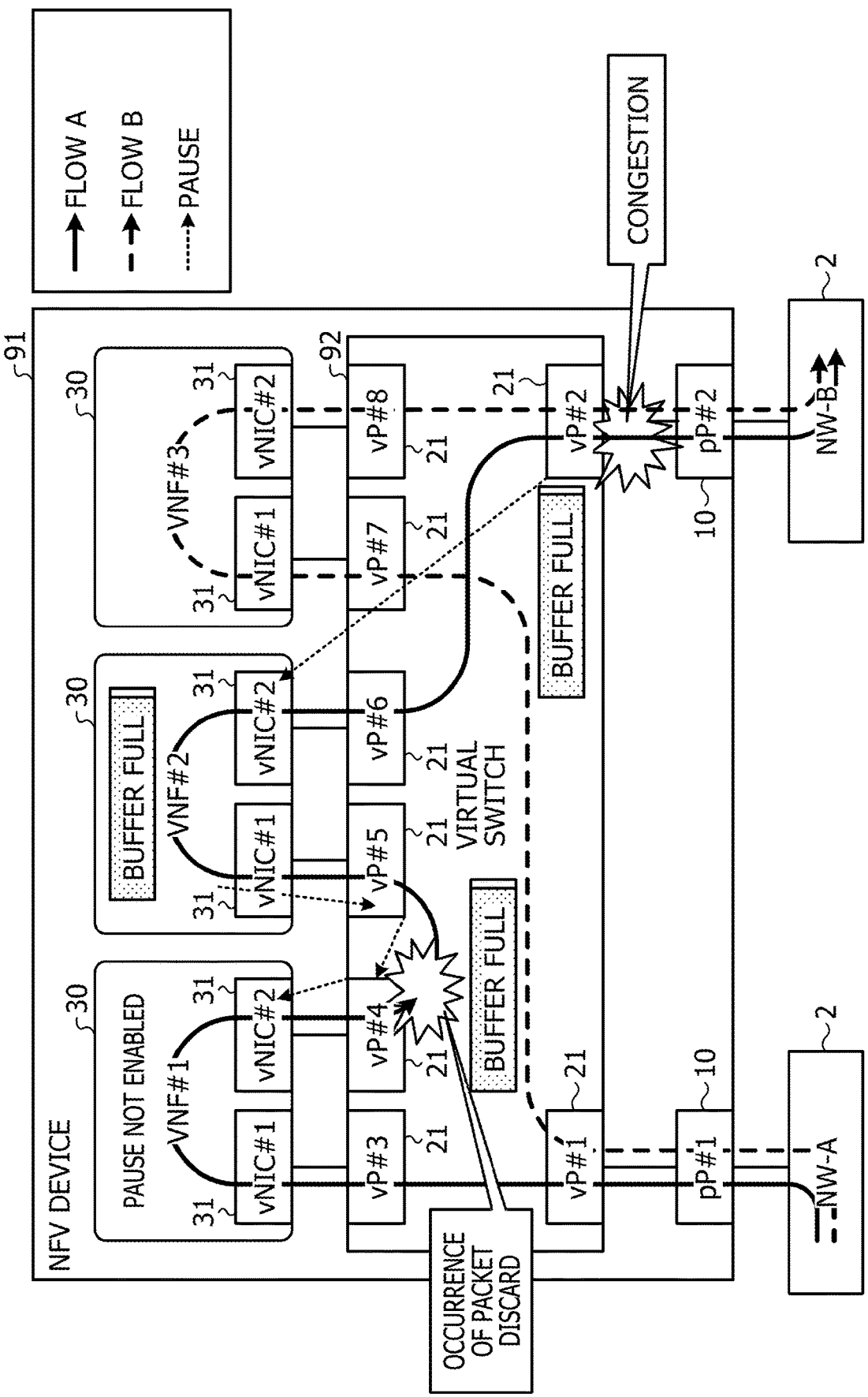
FIG. 12 is an explanatory diagram of a problem that is caused by PAUSE propagation.

When transmission rate control of a certain flow is performed at an exit of an information processing apparatus on which a VNF is operated, PAUSE propagation may occur in the information processing apparatus. PAUSE is a transmission suppression instruction to a transmission side. Transmission suppression instructions include a back pressure, a congestion notification, and the like in addition to PAUSE. FIG. 12 is an explanatory diagram of a problem that is caused by PAUSE propagation. In FIG. 12, an NFV device 91 is an information processing apparatus on which three VNFs 30 denoted by VNF #1 to VNF #3 and a virtual switch 92 operate.

The NFV device 91 includes two physical ports 10 denoted by pP #1 and pP #2. The virtual switch 92 includes eight virtual ports 21 denoted by vP #1 to vP #8. The VNF 30 includes two virtual network interface cards 31 denoted by vNIC #1 and vNIC #2. NW-A and NW-B are external networks 2.

A flow A flows from NW-A to NW-B via pP #1, vP #1, vP #3, vNIC #1, VNF #1, vNIC #2, vP #4, vP #5, vNIC #1, VNF #2, vNIC #2, vP #6, vP #2, and pP #2. A flow B flows from NW-A to NW-B via pP #1, vP #1, vP #7, vNIC #1, VNF #3, vNIC #2, vP #8, vP #2, and pP #2.

If congestion of the flow A occurs at vP #2, a PAUSE instruction is transmitted from the virtual switch 92 to VNF #2, the PAUSE instruction is transmitted from VNF #2 to the virtual switch 92, and the PAUSE instruction is transmitted from the virtual switch 92 to VNF #1, which results in propagation of the PAUSE instruction. The VNF 30 and the virtual switch 92 that have received the PAUSE instruction suppress transmission of packets and save the packets in a buffer if they receive packets of the suppressed transmission rate or more. If the buffer becomes full, packets are discarded.

In this manner, with the related-art technique, there is a problem in that if PAUSE propagation occurs due to congestion of the flow A, the buffers along the path of the flow A are occupied by the flow A, and thus the resources to be used as the buffers are not effectively utilized. If there is a PAUSE-not-enabled VNF 30, such as VNF #1, the buffer becomes full, and thus it is not possible to avoid packet discarding.

In the following, a detailed description will be given of an information processing apparatus and an information processing method according to an embodiment of the present disclosure with reference to the drawings. The embodiment will not limit the technique of the disclosure.

Embodiment

First, a description will be given of a transmission suppression instruction by an NFV device according to the embodiment. FIG. 1 is an explanatory diagram of a transmission suppression instruction by an NFV device according to an embodiment. In FIG. 1, an NFV device 1 is an information processing apparatus in which three VNFs 30 denoted by VNF #1 to VNF #3 and a virtual switch 20 operate.

The NFV device 1 includes two physical ports 10 denoted by pP #1 and pP #2. The virtual switch 20 includes eight virtual ports 21 denoted by vP #1 to vP #8. The VNF 30 includes two virtual network interface cards 31 denoted by vNIC #1 and vNIC #2. NW-A and NW-B are external networks 2.

A flow A flows from NW-A to NW-B via pP #1, vP #1, vP #3, vNIC #1, VNF #1, vNIC #2, vP #4, vP #5, vNIC #1, VNF #2, vNIC #2, vP #6, vP #2, and pP #2. A flow B flows from NW-A to NW-B via pP #1, vP #1, vP #7, vNIC #1, VNF #3, vNIC #2, vP #8, vP #2, and pP #2.

If congestion of a flow occurs at the exit port vP #2 in the virtual switch 20, the virtual switch 20 identifies an original flow and transmits a PAUSE instruction of the identified original flow from vP #1 to NW-A. The original flow is the same flow at the entry port vP #1 as the flow at the exit port vP #2.

Accordingly, it is possible for the virtual switch 20 to avoid PAUSE propagation in the NFV device 1 so as to reduce the buffer usage, and thus to effectively utilize the resources to be used as a buffer. It is also possible for virtual switch 20 to avoid discarding a packet due to buffer full in the case where the VNF 30 is not PAUSE-enabled.

In FIG. 1, if congestion of the output flow A occurs at vP #2, the virtual switch 20 identifies the input flow A at vP #1. If the header information of a packet is the same between the input flow A and the output flow A, it is possible to easily identify the input flow A from the output flow A. However, the VNF 30 sometimes converts the header information of an input packet and outputs the packet, and thus the header information of the output flow A at vP #2 sometimes differs from the header information of the input flow A at vP #1.

Figure 2A:
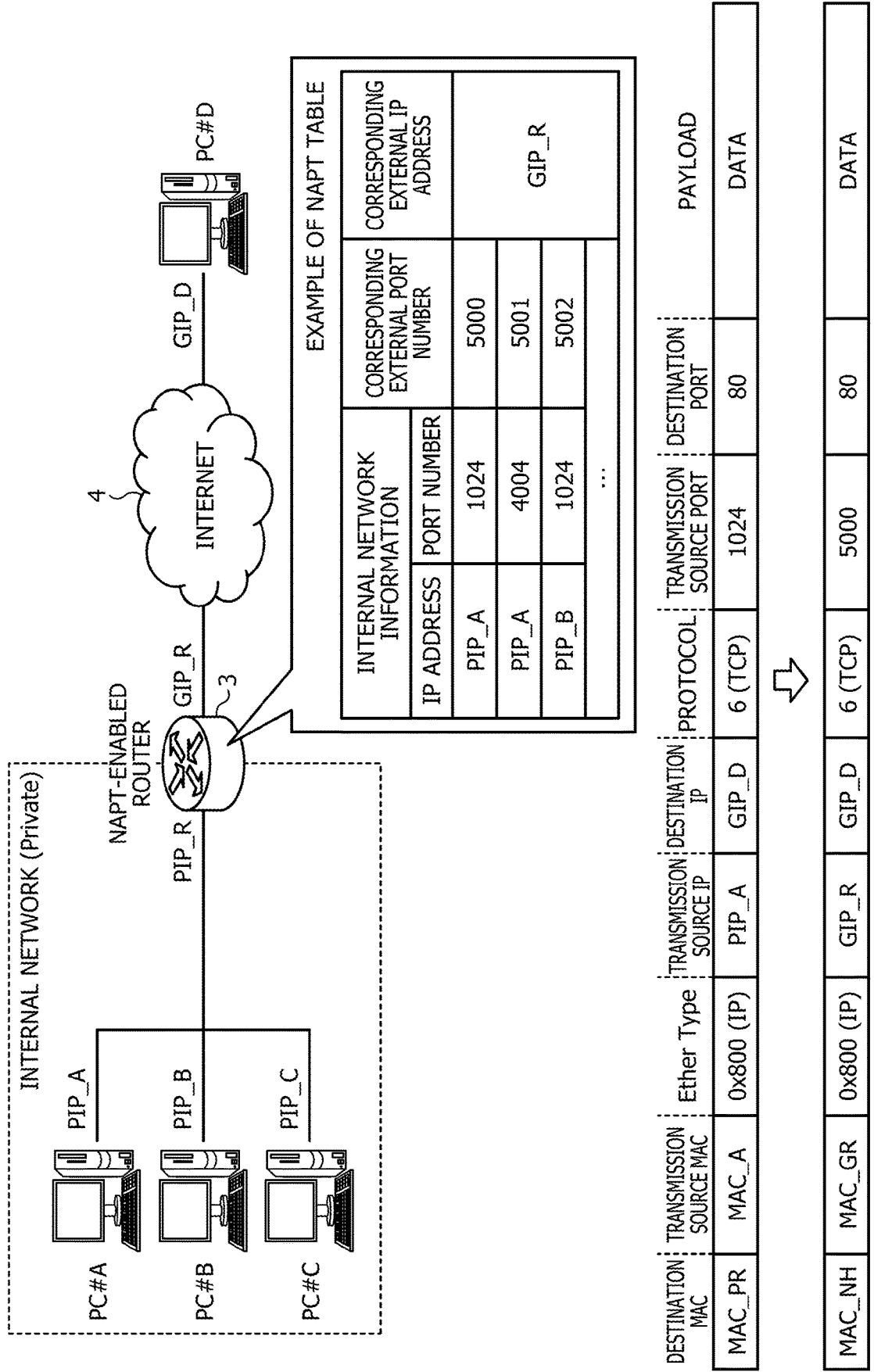
FIG. 2A is a diagram illustrating an example of packet conversion in VNF.

FIG. 2A is a diagram illustrating an example of packet conversion in the VNF 30. FIG. 2A illustrates the case where the VNF 30 is Network Address Translation (NAT) & Port Address Translation (PAT) (NAPT)-enabled. In FIG. 2A, PC # A to PC # C are personal computers (PCs) connected to an internal network and are to be connected to PC # D via an NAPT-enabled router 3 and the Internet 4. In a NAPT table of the NAPT-enabled router 3, for example, an internal Internet Protocol (IP) address "PIP_A" of PC # A is associated with an external IP address "GIP_R", and an internal port number "1024" is associated with an external port number "5000".

If PC # A accesses a Web server (destination port number=80) of PC # D, the NAPT-enabled router 3 converts the transmission source IP of a transmission packet from "PIP_A" to "GIP-R" using the NAPT table and converts the transmission source port number from "1024" to "5000".

In this manner, if the VNF 30 is NAPT-enabled, the transmission source IP and the transmission source port number of a transmission packet are converted. In FIG. 2A, the destination MAC and the transmission source MAC are converted by the router function. MAC_NH is a MAC address of the next hop resolved by the router and MAC_GR is a MAC address corresponding to GIP_R.

FIG. 2B is a diagram illustrating another example of packet conversion in the VNF 30. FIG. 2B illustrates the case where the VNF 30 is a Virtual eXtensibe Local Area Network (VxLAN) gateway. VxLAN is one of the network virtualization technology that makes it possible for an L2 network to extensible over a router by encapsulation.

In VxLAN, an original packet transmitted by the operating system (OS) is encapsulated using User Datagram Protocol (UDP). That is to say, for example, an external header is added to the original packet, and the original packet is transferred via an L2/L3 network. Encapsulation and decapsulation are performed at a VxLAN-enabled end point (Virtual Tunnel End Point (VTEP)) or at a gateway (GW).

In encapsulation, address resolution of transmission destination VTEP or GW is performed in accordance with the destination of the original packet, and an external header having the own VTEP or a GW address as a transmission source is added to the original packet. An external header includes a destination VTEPMAC, a transmission source VTEPMAC, a destination VTEPIP, a transmission source VTEPIP, a UDP header, and a VxLAN header.

In this manner, if the VNF 30 is a VxLAN gateway, a destination VTEPMAC, a transmission source VTEPMAC, a destination VTEPIP, a transmission source VTEPIP, a UDP header, and a VxLAN header are added to the original packet.

Figure 3:
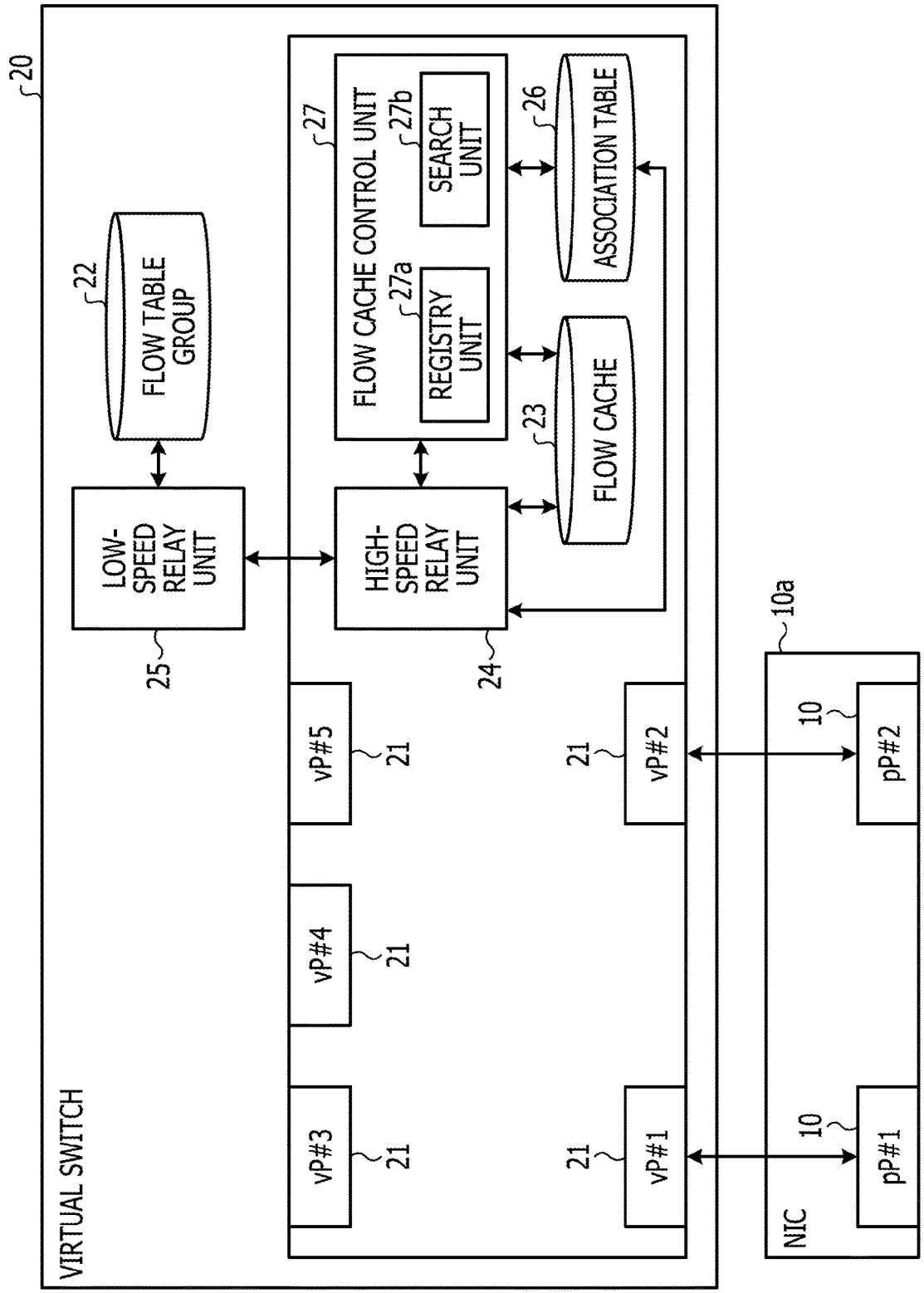
FIG. 3 is a diagram illustrating the functional configuration of a virtual switch.

Next, a description will be given of the functional configuration of the virtual switch 20. FIG. 3 is a diagram illustrating the functional configuration of the virtual switch 20. As illustrated in FIG. 3, the virtual switch 20 includes five virtual ports 21 denoted by vP #1 to vP #5, a flow table group 22, a flow cache 23, a high-speed relay unit 24, a low-speed relay unit 25, an association table 26, and a flow cache control unit 27. In FIG. 3, only five virtual ports 21 out of the eight virtual ports 21 illustrated in FIG. 1 are illustrated for convenience of explanation. The number of virtual ports 21 may be less than eight, or nine or more.

The virtual port 21 is an interface to be used for inputting and outputting packets. The virtual port vP #1 is connected to a physical port 10 denoted by pP #1, and the virtual port vP #2 is connected to a physical port 10 denoted by pP #2. The physical ports pP #1 and pP #2 are included in an NIC 10a.

The flow table group 22 is a series of flow tables that define actions for flows. Actions include, for example, specification of output of a packet from any one of the virtual ports 21, and specification of a flow table to be used next. An action for a flow is identified using a chain of flow tables. The flow cache 23 is a cache for the flow table group 22. A flow is identified from a received packet. Accordingly, the flow table group 22 is said to be a series of tables that defines an action for a received packet.

When the high-speed relay unit 24 receives a packet, the high-speed relay unit 24 determines and executes an action for the packet using the flow cache 23. If an action for a packet is not recorded in the flow cache 23, the high-speed relay unit 24 passes the packet to the low-speed relay unit 25 and requests the low-speed relay unit 25 to determine an action. The low-speed relay unit 25 determines an action for the packet using the flow table group 22.

Figure 4:
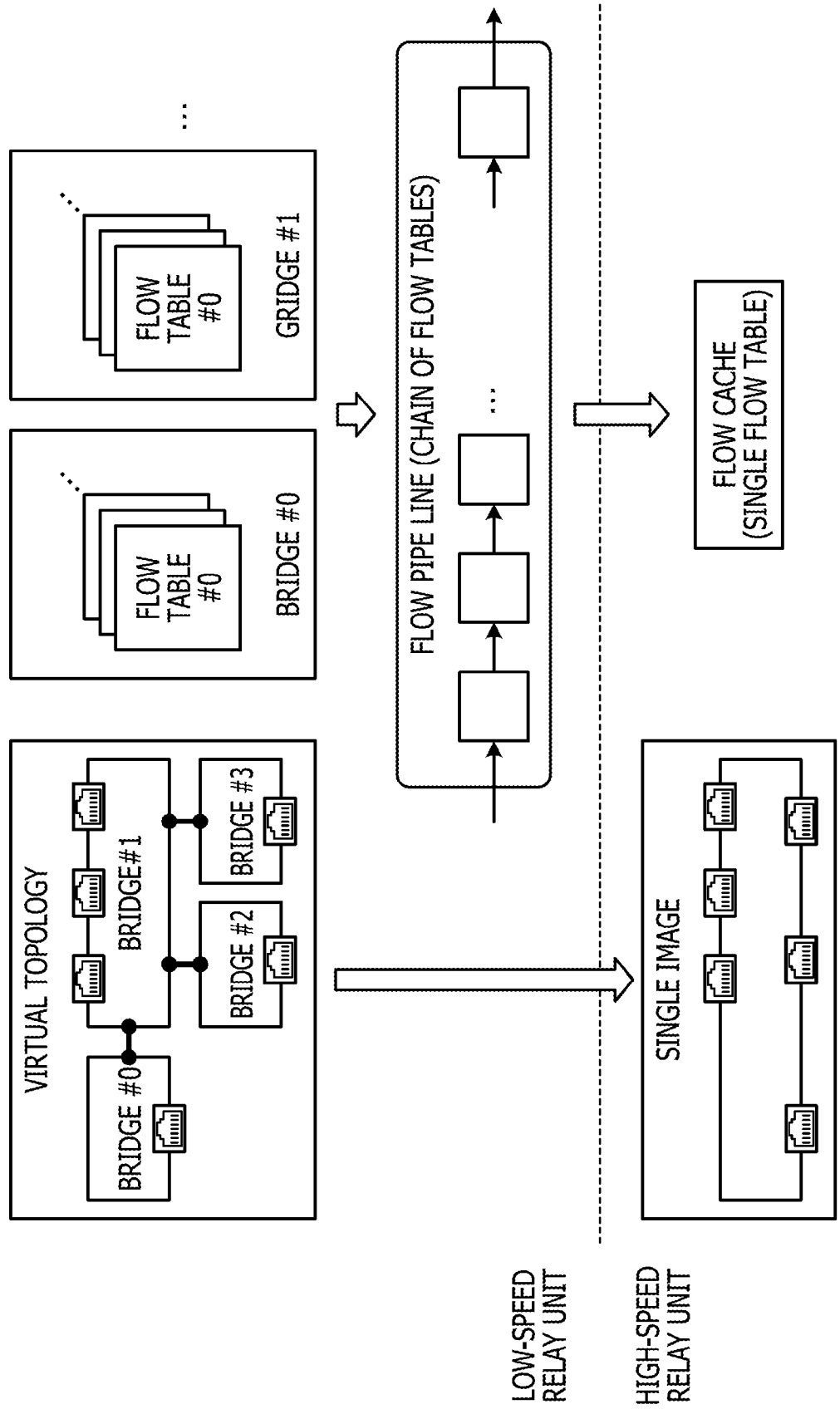
FIG. 4 is an explanatory diagram of a high-speed relay unit and a low-speed relay unit.

FIG. 4 is an explanatory diagram of the high-speed relay unit 24 and the low-speed relay unit 25. As illustrated in FIG. 4, in the low-speed relay unit 25, a virtual topology including a plurality of bridges (logical switches) is used, and a series of flow tables is used for each bridge. The low-speed relay unit 25 determines an action for a flow using a flow pipeline, which is a chain of flow tables, so as to make it possible to correspond to the flexible topology configuration of the virtual switch 20.

On the other hand, in the high-speed relay unit 24, the flow cache 23 that indicates a relationship between the action determined using a flow pipeline and a flow as a single flow table is used so as to regard the virtual switch 20 as a single bridge and makes it possible to determine an action at high speed.

The low-speed relay unit 25 passes the information regarding the determined action to the high-speed relay unit 24. The high-speed relay unit 24 executes the determined action and records the information of the flow and the action in the flow cache 23.

The association table 26 is a table that manages a corresponding relationship between the preceding-stage flow and the subsequent flow. The association table 26 records information on a flow and information on the preceding-stage flow candidate of the flow. The preceding-stage flow candidate is a flow having the input port of the flow as an output port and the duration in the flow cache 23, which is less than or equal to a threshold value, and is a flow group having a possibility of a preceding-stage flow of the flow. The flows included in a flow group are given priorities.

The flow cache control unit 27 identifies a flow, at the entry port of the NFV device 1, corresponding to the flow in which congestion has occurred at exit port of the NFV device 1 using the flow cache 23 and the association table 26. The flow cache control unit 27 includes a registration unit 27a and a search unit 27b.

The registration unit 27a records the flow information and the preceding-stage flow candidate information in the association table 26 based on the flow cache 23 and the association table 26 when the high speed relay unit 24 records flow information in the flow cache 23.

The search unit 27b traces the preceding-stage flows in the association table 26 for the flow in which congestion has occurred at an external output port in sequence based on the priority so as to identify the original flow and transmits a transmission suppression instruction of the original flow from the external input port of the original flow.

If the flow rate of the suppression flow is decreased by the transmission suppression instruction, the search unit 27b determines that the relationship with the preceding-stage flow traced in the association table 26 is correct and the search unit 27b deletes the other candidates from the preceding-stage flow candidates. On the other hand, if the flow rate of the suppression flow is not decreased by the transmission suppression instruction, the search unit 27b determines that the relationship with the preceding-stage flow traced in the association table 26 is not correct and releases the transmission suppression instruction and identifies the original flow using the candidate having the next highest priority.

Figure 5B:
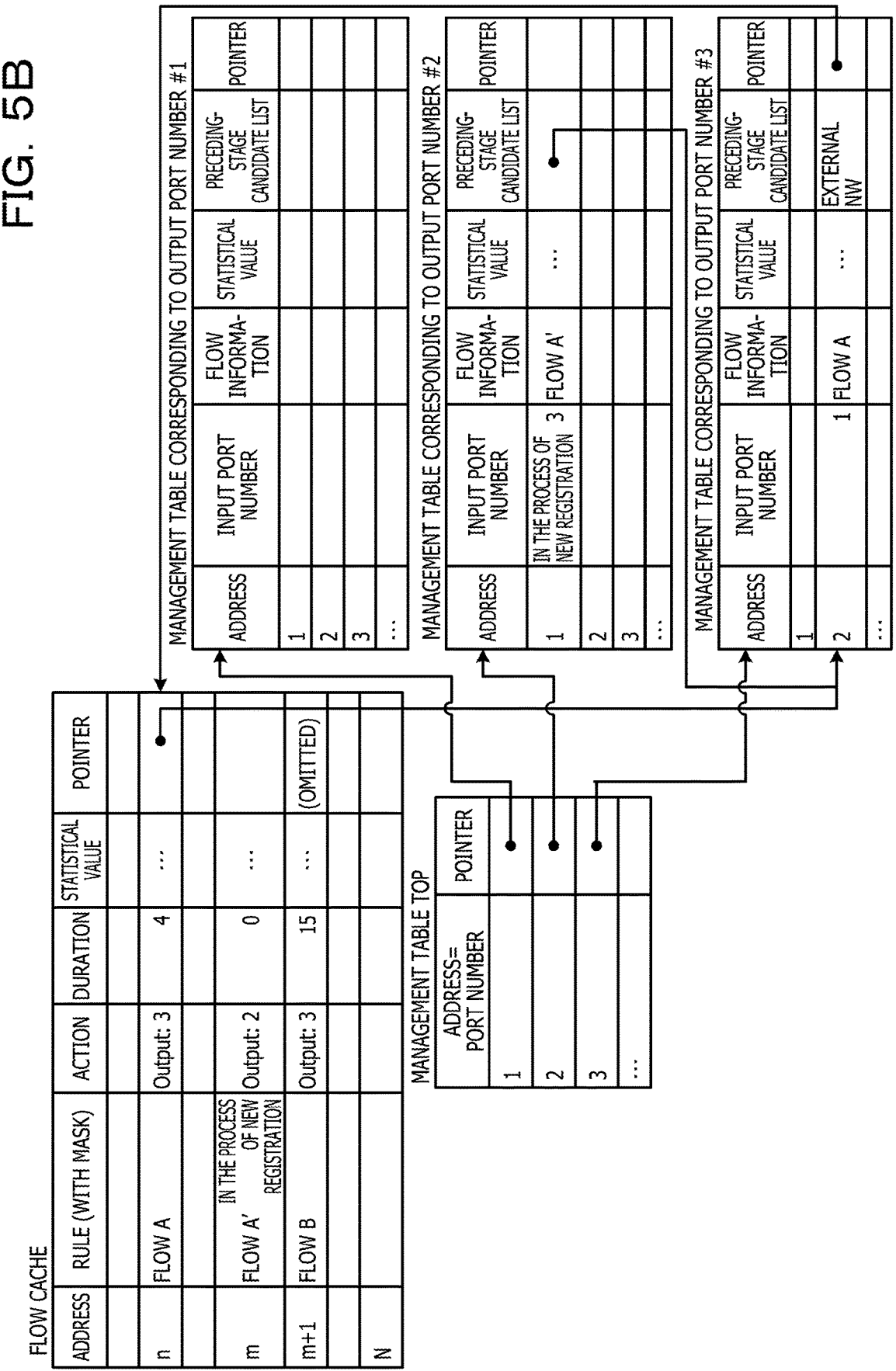
FIG. 5B is a diagram illustrating an example of a flow cache and an association table.

FIG. 5A and FIG. 5B are diagrams illustrating examples of the processing performed by the flow cache control unit 27. FIG. 5A is a diagram illustrating an example of a flow, and FIG. 5B illustrates an example of the flow cache 23 and the association table 26. In FIG. 5B, a combination of a management table top and management tables for individual output port numbers is the association table 26.

As illustrated in FIG. 5A, a flow A, which is entered from the outside and processed by VNF #1 and transmitted to the outside, is converted into a flow A' by VNF #1. At this time, the flow cache control unit 27 creates a corresponding relationship in which the original flow of the flow A' is the flow A. The input port of the flow A is vP #1, and the output port thereof is vP #3. The input port of the flow A' is vP #3, and the output port thereof is vP #2.

As illustrated in FIG. 5B, the flow cache 23 records address, rule, action, duration, statistical value, and pointer for each flow. An address indicates the position where a flow is recorded. A rule is a matching rule to be used for identifying a flow from the received packet. In FIG. 5B, a name of a flow identified by a rule, such as flow A or flow A' is illustrated for convenience of explanation.

An action indicates an action for a flow. For example, "Output: 3" indicates that a packet is transmitted from the port (vP #3) having the number #3. A duration is a time period that has elapsed from when the flow was recorded in the flow cache 23. The unit is, for example, a millisecond. A statistical value includes the number of packets of a flow, the number of bytes, the amount of increase in the number of packets per unit time, and the amount of increase in the number of bytes per unit time. A pointer is a pointer to the recording position of a flow in the management table corresponding to an output port number.

The management table top associates an address and a pointer to the management table. An address is a port number, and thus the management table top associates a port number with a pointer to the management table.

The management table is provided for each output port number. Each management table records address, input port number, flow information, statistical value, preceding-stage candidate list, and pointer for each flow. An address indicates the position where a flow is recorded. An input port number is the number of a virtual port 21 to which a flow is input. Flow information is a rule of the flow cache 23.

A statistical value is a statistical value of the flow cache 23. A statistical value of the flow cache 23 is reflected on a management table at regular intervals or at the time when a flow is deleted from the flow cache 23 due to aging. A preceding-stage candidate list is a pointer group to the management table in which a preceding-stage flow candidate is recorded. A pointer is a pointer indicating the position of a flow in the flow cache 23.

FIG. 5A illustrates a state where the information on the flow A is recorded in the flow cache 23 and the management table, and the information on the flow A' is to be recorded in the flow cache 23. The output port number of the flow A is "3", and thus the information on the flow A is recorded in the management table corresponding to the output port number #3.

When the flow A' is recorded in the flow cache 23, since the output port number of the flow A' is "2", the registration unit 27a records the information of the flow A' in the management table corresponding to the output port number #2. At this time, since the input port number of the flow A' is "3", the registration unit 27a extracts, from the flow cache 23, a flow having the output port number of "3" and the duration less than or equal to a threshold value as a preceding-stage flow candidate.

Assuming that the threshold value is "5", the flow B is excluded because of having the duration of "15", and the flow A is extracted as a preceding-stage flow candidate. The registration unit 27a sets the pointer to the flow A in the management table corresponding to the output port number #3 in the preceding-stage candidate list of the flow A' in the management table corresponding to the output port number #2.

In this manner, at the time when a flow is recorded in the flow cache 23, the registration unit 27a identifies a preceding-stage flow candidate and records the information of the flow in the management table so that it is possible for the search unit 27b to trace the original input flow from the congested output flow.

The VNF 30 sometimes converts the header information of an input packet and outputs the packet, and thus packets of the same flow sometimes have different header information. Accordingly, in the flow cache 23 and the association table 26 in which information on a flow identified from the header information of a packet is recorded, the same flow may be recorded as different flows as the flow A and the flow A' illustrated in FIG. 5A.

If there is a plurality of preceding-stage flow candidates, the registration unit 27a adds a priority to each preceding-stage flow candidate in accordance with a predetermined algorithm. For example, it is expected that there is a similarity in the statistical value regarding a preceding-stage flow and a subsequent-stage flow before and after the conversion by the VNF 30, and thus the registration unit 27a adds a priority to each preceding-stage flow candidate when a statistical value is reflected on the management table based on the similarity of the statistical value.

There are VNFs 30, which convert only a part (destination address, or the like) of the header information, such as a router, a load balancer, or the like, an thus there is a high possibility that the corresponding relationship between the preceding-stage flow and the subsequent-stage flow based on the similarity of the other parts of the header information. Thus, the registration unit 27a may add a priority to each preceding-stage flow candidate based on the similarity of the header information.

In overlay network technology, such as VxLAN, Network Virtualization using Generic Routing Encapsulation (NVGRE), or the like, protocols are provided that encapsulate an original packet in an IP packet, or the like and includes the header information of the packet before the conversion in the beginning of the payload. Accordingly, it is possible to determine the corresponding relationship between the preceding-stage flow and the subsequent-stage flow based on the sameness of the header information before and after conversion with the beginning of the payload. Thus, the registration unit 27a may add a priority to each preceding-stage flow candidate based on the sameness of the header information of the preceding-stage flow and the payload of the subsequent-stage flow.

Alternatively, the registration unit 27a may add a priority to each preceding-stage flow candidate based on a combination of the methods described above.

In FIG. 5A, the VNF 30 is connected using the virtual switch 20 and one virtual port 21. However, the VNF 30 may be connected using the virtual switch 20 and a plurality of virtual ports 21. In such a case, the flow cache control unit 27 manages the association table 26 using a port group including one or more virtual ports 21. The flow cache control unit 27 may form a group such that virtual ports 21 connected to the same VNF 30 are included in the same group.

The flow cache control unit 27 stores the port and group corresponding table in which the number of a virtual port 21 and a group number are associated. The flow cache control unit 27 obtains a group number from the port and group corresponding table at the time of checking the corresponding relationship between an input port and an output port and makes a comparison using a group number so as to make it possible to create a corresponding relationship of the flows between before and after the conversion by the VNF 30. In the association table 26, a group number is used in place of the number of a virtual port 21.

Figure 6:
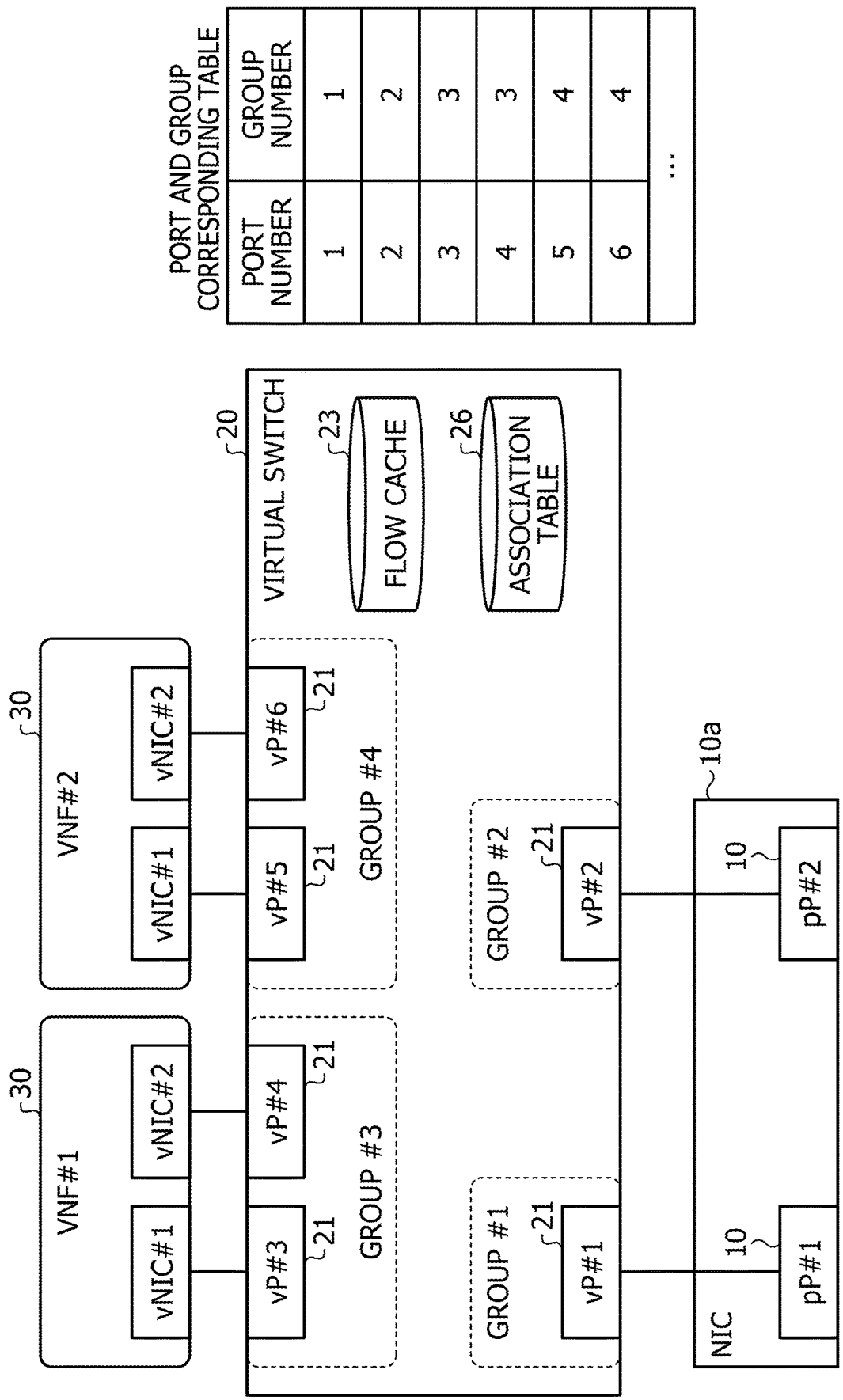
FIG. 6 is a diagram illustrating an example of a port and group corresponding table.

FIG. 6 is a diagram illustrating an example of the port and group corresponding table. In FIG. 6, vP #1 to vP #6 are grouped into four groups. The group #1 includes vP #1, the group #2 includes vP #2, group #3 includes vP #3 and vP #4, and the group #4 includes vP #5 and vP #6.

In the port and group corresponding table, the port number "1" is associated with the group number "1", and the port number "2" is associated with the group number "2". The port numbers "3" and "4" are associated with the group number "3", and the port numbers "5" and "6" are associated with the group number "4".

Figure 7:
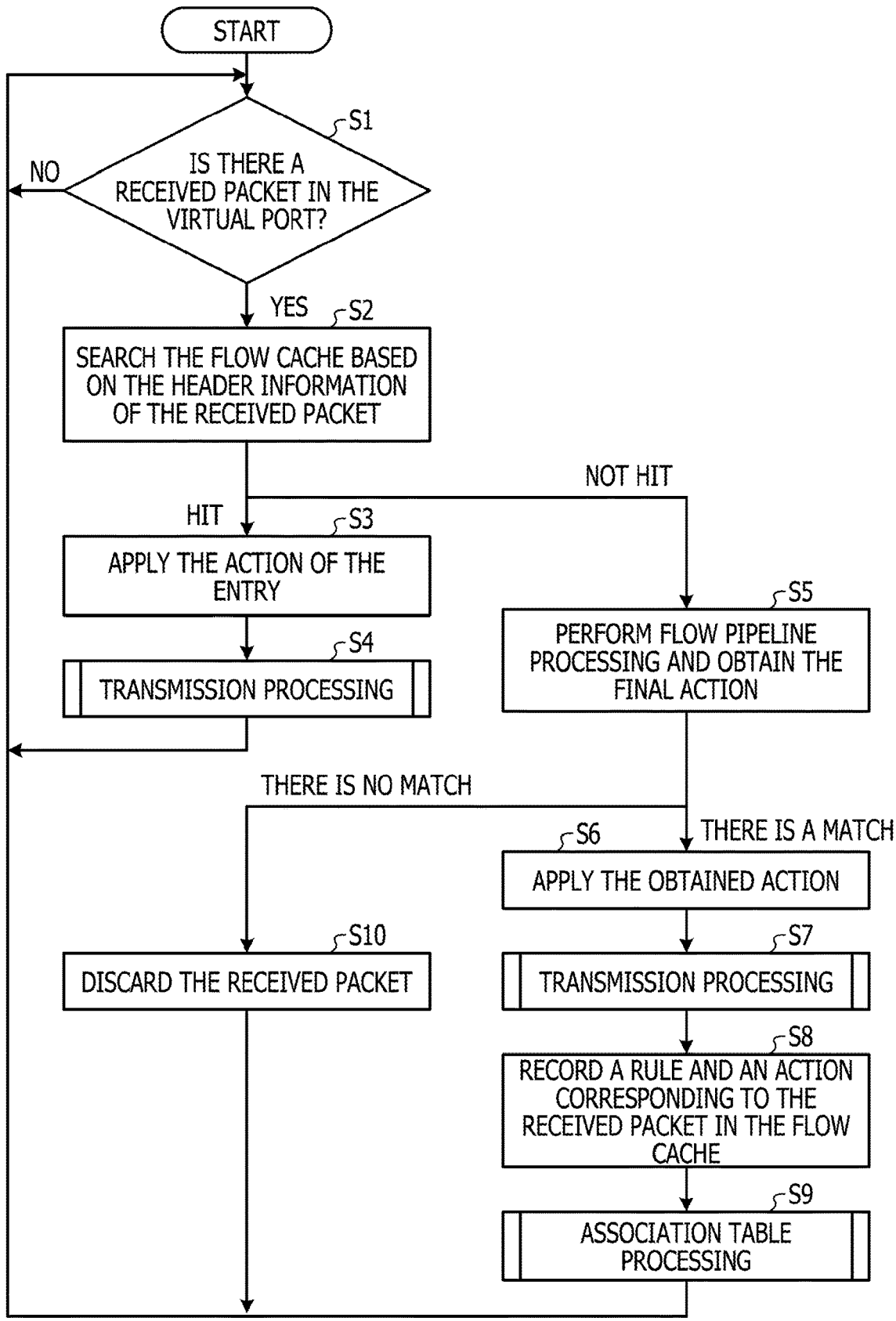
FIG. 7 is a flowchart illustrating the flow of reception processing performed by the virtual switch.

Next, a description will be given of the flow of the processing performed by the virtual switch 20 with reference to FIG. 7 to FIG. 11. FIG. 7 is a flowchart illustrating the flow of reception processing performed by the virtual switch virtual switch 20. As illustrated in FIG. 7, the virtual switch 20 determines whether or not there is a received packet in the virtual port 21 (step S1), and while there are no received packets, the processing in step S1 is repeated.

On the other hand, if there is a received packet in the virtual port 21, the virtual switch 20 searches the flow cache 23 based on the header information of the received packet (step S2). If there is a hit in the flow cache 23, the virtual switch 20 applies the action on the entry of the flow cache 23 (step S3) and performs transmission processing for transmitting the received packet (step S4). The processing of the virtual switch 20 returns to step S1.

On the other hand, if there are no hits in the flow cache 23 in step S2, the virtual switch 20 performs flow pipeline processing and obtains a final action (step S5). If there is a match in the flow pipeline processing and the final action is obtained, the virtual switch 20 applies the obtained action (step S6) and performs the transmission processing (step S7). The virtual switch 20 records a rule and an action that correspond to the received packet in the flow cache 23 (step S8) and performs association table processing for recording information in the association table 26 (step S9). The processing of the virtual switch 20 returns to step S1.

On the other hand, if there is no match in the flow pipeline processing, the virtual switch 20 discards the received packet (step S10), and the processing returns to step S1.

In this manner, the virtual switch 20 records information in the association table 26 at the time of recording a rule and an action in the flow cache 23 so that when congestion occurs in an output flow, it is possible for the virtual switch 20 to identify an original input flow.

Figure 8:
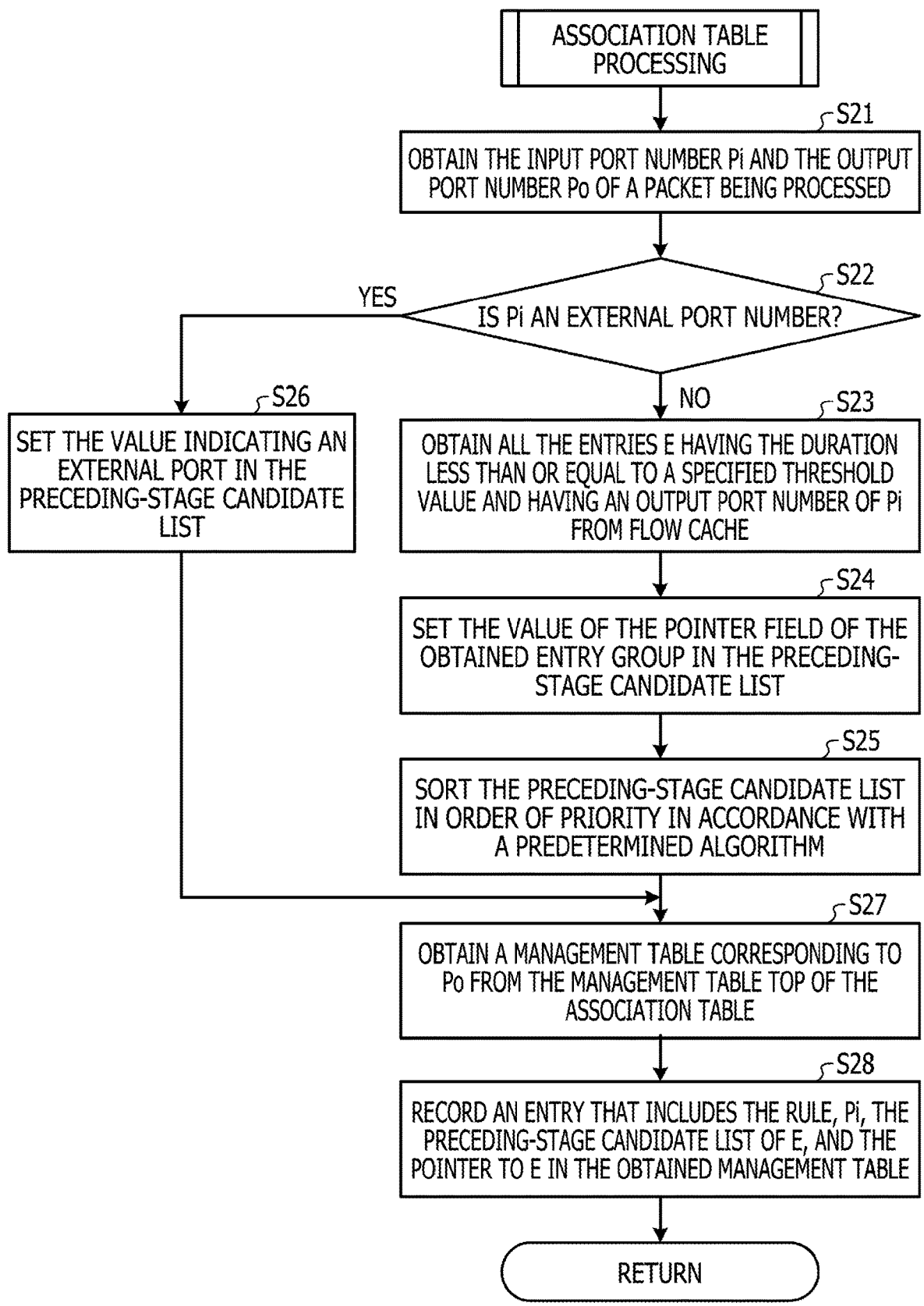
FIG. 8 is a flowchart illustrating the flow of association table processing.

FIG. 8 is a flowchart illustrating the flow of the association table processing. As illustrated in FIG. 8, the registration unit 27a obtains an input port number Pi and an output port number Po of a packet being processed (step S21) and determines whether or not Pi is the number of an external port (step S22).

If the input port number Pi is not an external port number, the registration unit 27a obtains, from the flow cache 23, all the entries E having the duration less than or equal to a specified threshold value and having an output port number of Pi (step S23). The registration unit 27a sets the value of the pointer field of the obtained entry group in the preceding-stage candidate list (step S24) and sorts the preceding-stage candidate list in order of priority in accordance with a predetermined algorithm (step S25). On the other hand, if the input port number Pi is an external port number, the registration unit 27a sets a value indicating an external port in the preceding-stage candidate list (step S26).

The registration unit 27a obtains a management table corresponding to Po from the management table top of the association table 26 (step S27) and records an entry that includes the rule, Pi, and the preceding-stage candidate list of E, and the pointer to E in the obtained management table (step S28).

In this manner, the registration unit 27a extracts a candidate of the preceding-stage flow from the flow cache 23 and records the information on the candidate of the preceding-stage flow in the association table 26 as a preceding-stage candidate list so that it is possible for the search unit 27b to identify the original input flow.

Figure 9:
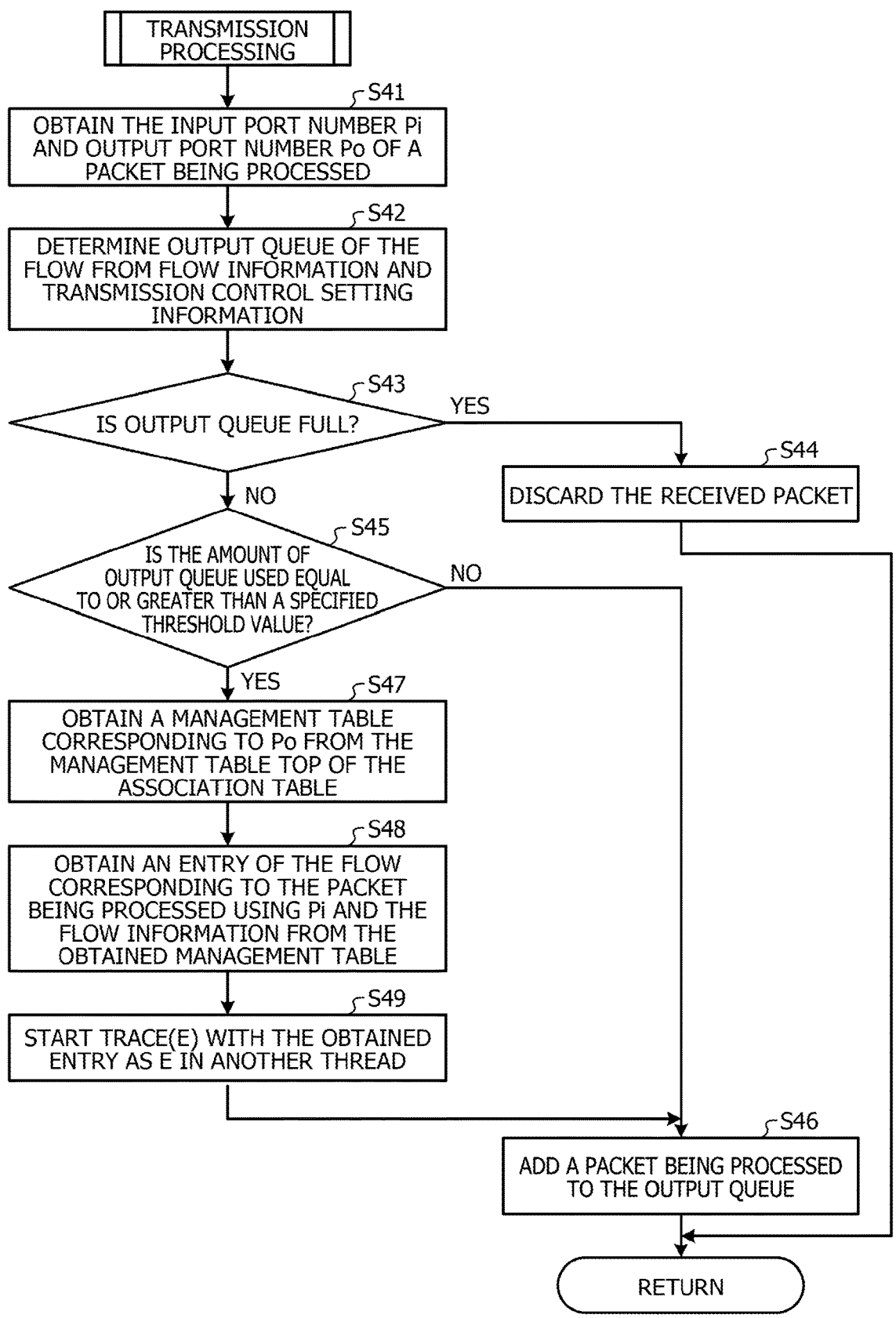
FIG. 9 is a flowchart illustrating the flow of transmission processing.

FIG. 9 is a flowchart illustrating the flow of transmission processing. As illustrated in FIG. 9, the virtual switch 20 obtains the input port number Pi and the output port number Po of the packet being processed (step S41) and determines the output queue of the flow from the flow information and the transmission control setting information (step S42).

The virtual switch 20 determines whether or not the output queue is full (step S43). If the output queue is full, the virtual switch 20 discards the received packet (step S44). On the other hand, if the output queue is not full, the virtual switch 20 determines whether or not the amount of the output queue used is equal to or greater than a threshold value (step S45). If the amount of the output queue used is not equal to or greater than the threshold value, the virtual switch 20 adds the packet being processed to the output queue (step S46).

On the other hand, if the amount of the output queue used is equal to or greater than a specified threshold value, the virtual switch 20 obtains a management table corresponding to Po from the management table top of the association table 26 (step S47). The virtual switch 20 obtains an entry of a flow corresponding to a packet being processed using Pi and the information of the flow from the obtained management table (step S48) and starts Trace(E) with the entry of E in another thread (step S49). Trace(E) is the processing in which the search unit 27b traces the preceding-stage flow in the association table 26 based on priority so as to identify an original flow of the flow of E and to transmit a transmission suppression instruction of the original flow from the external input port of the original flow.

Figure 10:
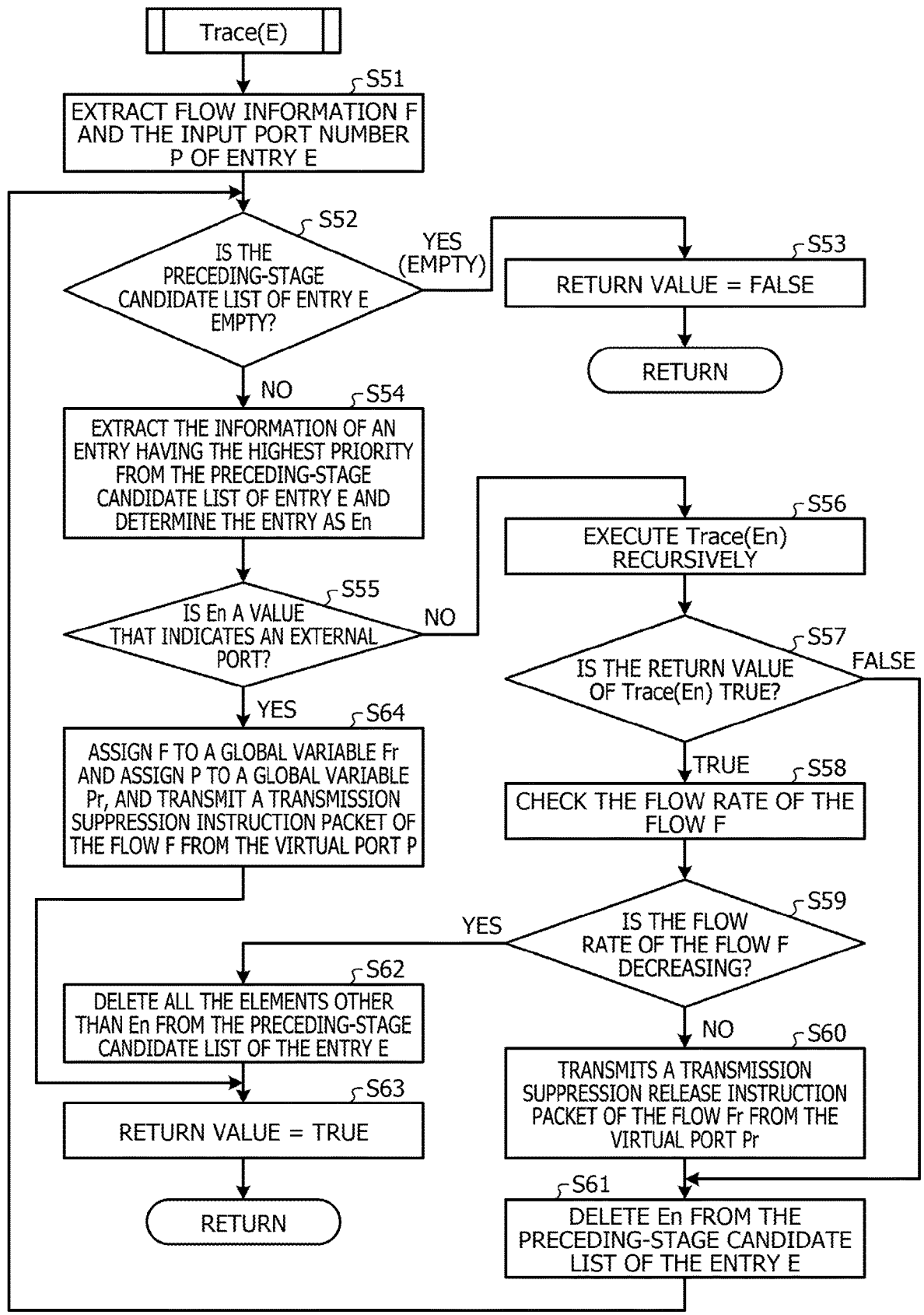
FIG. 10 is a flowchart illustrating the processing flow of Trace(E)

FIG. 10 is a flowchart illustrating the processing flow of Trace(E). As illustrated in FIG. 10, the search unit 27b extracts the flow information F and the input port number P of the entry E (step S51) and determines whether or not the preceding-stage candidate list of the entry E is empty (step S52). If the preceding-stage candidate list of the entry E is empty, the processing of the search unit 27b is terminated with the return value of FALSE (step S53).

On the other hand, if the preceding-stage candidate list of the entry E is not empty, the search unit 27b extracts the information of an entry having the highest priority from the preceding-stage candidate list of the entry E and determines the entry as En (step S54). The search unit 27b determines whether or not En is a value that indicates an external port (step S55). If En is not a value that indicates an external port, the search unit 27b executes Trace(En) recursively (step S56).

The search unit 27b determines whether or not the return value of Trace(En) is TRUE (step S57). If the return value is TRUE, the search unit 27b checks the flow rate of the flow F (step S58). The search unit 27b determines whether or not the flow rate of the flow F is decreasing (step S59). If the flow rate of the flow F is not decreasing, the search unit 27b transmits a transmission suppression release instruction packet of the flow Fr from the virtual port Pr (step S60). The search unit 27b deletes En from the preceding-stage candidate list of the entry E (step S61), and the processing returns to step S52.

On the other hand, if the flow rate of the flow F is decreasing, the search unit 27b deletes all the elements other than En from the preceding-stage candidate list of the entry E (step S62), and the processing is terminated with the return value of TRUE (step S63). In step S57, if the return value of Trace(En) is not TRUE, the processing of the search unit 27b proceeds to step S61.

In step S55, if En is a value that indicates an external, the search unit 27b assigns F to a global variable Fr and assigns P to a global variable Pr, and transmits a transmission suppression instruction packet of the flow F from the virtual port P (step S64). The processing of the search unit 27b is terminated with the return value of TRUE (step S63).

In this manner, the search unit 27b traces the preceding-stage candidate list up to the original flow based on the priority and transmits a transmission forcing instruction packet of the original flow from the input port of the original flow so that it is possible avoid propagation of the transmission suppression instruction in the virtual switch 20.

As described above, in the embodiment, when the virtual switch 20 records the information of a flow of a received packet in the flow cache 23, the registration unit 27a identifies the preceding-stage flow of the flow based on the flow cache 23 and the association table 26. The registration unit 27a records the information including the identified preceding-stage flow in the association table 26. When the virtual switch 20 transmits a packet, if the output port from which the packet is transmitted is in a congested state, the search unit 27b identifies the original flow of the flow of the packet to be transmitted based on the association table 26. The search unit 27b transmits a transmission suppression instruction of the original flow.

Accordingly, it is possible for the virtual switch 20 to avoid propagation of a transmission suppression instruction in the virtual switch 20, and to effectively use the resources to be used as a buffer. When a VNF 30 that does not support a transmission suppression instruction is operated in the NFV device 1, it is possible for the virtual switch 20 to deal with congestion of an output port.

In the embodiment, the registration unit 27a determines the input port of the flow of a received packet as an output port and identifies a flow having a duration less than or equal to a predetermined threshold value by referring to the flow cache 23. The registration unit 27a identifies an entry associated with the output port of the identified flow and the entry associated with the identified flow from the association table 26 as the preceding-stage flow, creates an entry including the identified preceding-stage flow and output port as an input port, and records the entry in the association table 26. The search unit 27b identifies the preceding-stage flow corresponding to the flow of the transmission packet by referring to the association table 26 and identifies the original flow by tracing the preceding-stage flow in the association table 26 until the identified preceding-stage flow becomes a flow from the outside. Accordingly, it is possible for the search unit 27b to correctly identify the original flow.

In the embodiment, the candidates of the preceding-stage flow are arranged in the preceding-stage candidate list of the association table 26 with priority. The registration unit 27a gives a priority to each of the candidates of each preceding-stage flow included in the preceding-stage candidate list and sorts the preceding-stage candidate list with the priority and records the candidates in the association table 26. The search unit 27b traces the preceding-stage flows in descending order of the priority of the preceding-stage flows. Accordingly, it is possible for the search unit 27b to efficiently identify the original flow.

In the embodiment, the search unit 27b determines whether or not the flow rate of the original flow has decreased by transmitting a transmission suppression instruction of the original flow to the opposite device from the input port of the original flow. If the flow rate of the original flow has decreased, the search unit 27b deletes flows other than the preceding-stage flows used for identifying the original flow from the preceding-stage candidate list. On the other hand, if the flow rate of the original flow has not decreased, the search unit 27b releases the transmission suppression instruction and traces the preceding-stage flow having the next highest priority among the group so as to identify another original flow. Accordingly, it is possible for the search unit 27b to reliably identify the original flow.

In the embodiment, the virtual switch 20 transmits and receives packets with a plurality of VNFs 30, and thus has a large amount of communication and uses buffers more often compared with the case where another application runs on the VM. Accordingly, it is possible for the virtual switch 20 to reduce propagation of a transmission suppression instruction in the virtual switch 20 so as to more effectively utilize the resources to be used as a buffer.

In the embodiment, the virtual switch 20 realizes the association table 26 using the management table top and a plurality of management tables so as to make it possible to effectively realize the association table 26.

In the embodiment, the virtual switch 20 may group the virtual ports 21 and have a port and group corresponding table that indicates the association between a port number and a group number, and thus it is possible to establish a connection with one VNF 30 and a plurality of virtual ports 21.

In the embodiment, the registration unit 27a adds a priority to each of the preceding-stage flows based on the statistical values, for example, the number of packets of the flow, the number of bytes, the amount of increase of the number of packets per unit time, and the amount of increase of the number of bytes per unit time, and thus it is possible to add a suitable priority.

In the embodiment, the registration unit 27a adds a priority to each of the preceding-stage flows based on, for example, the similarity between the header information of the packet corresponding to the flow to be recorded in the association table 26 and the packet corresponding to the preceding-stage flow, and thus it is possible to give a suitable priority.

In the embodiment, the registration unit 27a adds a priority to each of the preceding-stage flows based on, for example, the similarity between the beginning of the payload included in a packet corresponding to the flow to be recorded in the association table 26 and the header information of the packet corresponding to the preceding-stage flow. Accordingly, it is possible for the registration unit 27a to give a suitable priority.

In the embodiment, the description has been given of the virtual switch 20. The virtual switch 20 is realized by program instructions included in a virtual switch program that has the same functions. Thus, a description will be given of a computer that executes the program instructions included in the virtual switch program.

Figure 11:
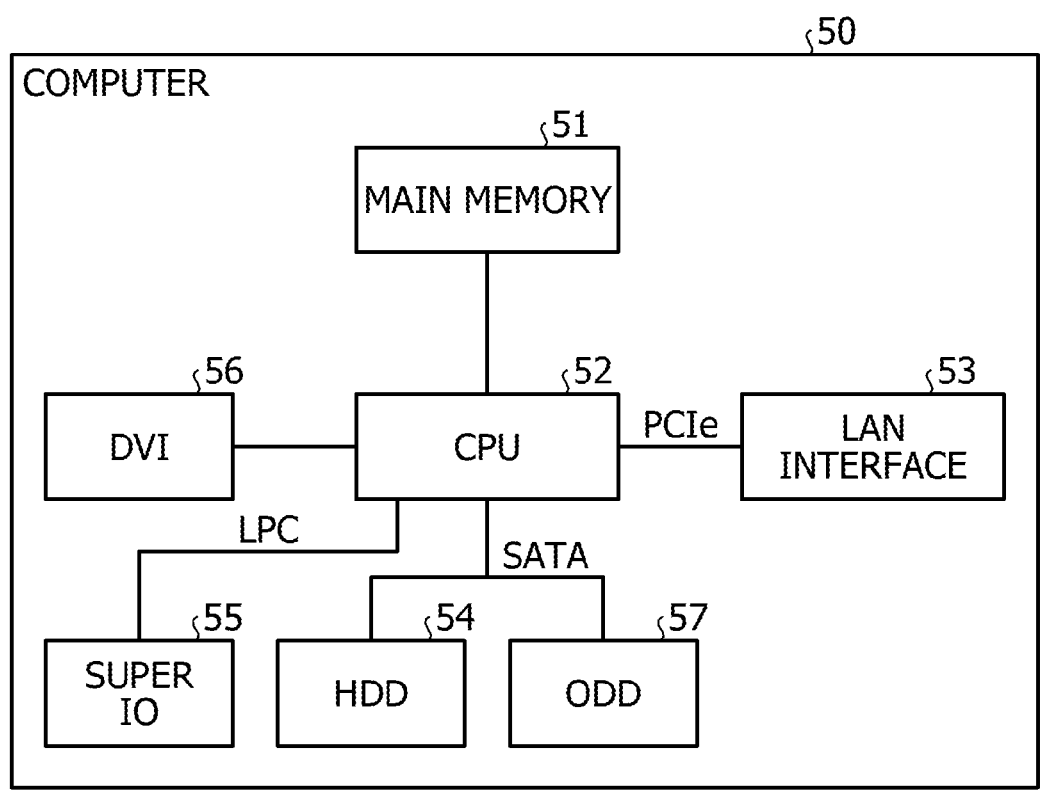
FIG. 11 is a diagram illustrating the hardware configuration of a computer that executes a virtual switch program.

FIG. 11 is a diagram illustrating the hardware configuration of a computer that executes the virtual switch program. As illustrated in FIG. 11, a computer 50 includes a main memory 51, a central processing unit (CPU) 52, a LAN interface 53, and a hard disk drive (HDD) 54. The computer 50 includes a Super Input/Output (IO)) 55, a digital visual interface (DVI) 56, and an optical disk drive (ODD) 57.

The main memory 51 is a memory that stores a program, an intermediate result of execution of the program, and the like. The CPU 52 is a central processing unit that reads a program from the main memory 51 and executes the program. The CPU 52 is a chip set that includes a memory controller.

The LAN interface 53 is an interface for connecting a computer 50 to another computer via a LAN. The HDD 54 is a disk device that stores programs and data. The super IO 55 is an interface for connecting input devices, such as a mouse, a keyboard, or the like. The DVI 56 is an interface that connects a liquid crystal display device, and the ODD 57 is a device that reads data from and writes data to a DVD.

The LAN interface 53 is connected to the CPU 52 by a PCI Express (PCIe). The HDD 54 and the ODD 57 are connected to the CPU 52 via Serial Advanced Technology Attachment (SATA). The Super IO 55 is connected to the CPU 52 by a Low Pin Count (LPC).

The virtual switch program that is to be executed by the computer 50 is stored by the computer 50 in a DVD, which is an example of a readable recording medium that is stored in the DVD, read from the DVD by the ODD 57 and installed in the computer 50. Alternatively, the virtual switch program is stored in a database of another computer system connected via the LAN interface 53, or the like, is read from the database, and is installed in the computer 50. The installed virtual switch program is stored in the HDD 54, is read into the main memory 51, and is executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device comprising:
one or more memories configured to store log information indicating an input port through which a packet included in one of flows are inputted, an output port through which the packet is outputted, and time related to input of the packet; and
one or more processors coupled to the one or more memories and the one or more processors configured to
on the basis of the log information, perform generation of relation information indicating relations among the flows,
when a first port is in a congested state, identify, in accordance with the relation information, an original flow on which a first flow is based, the first flow regarding a first packet included in an output queue of the first port,
output an instruction for suppressing transmission of a packet regarding the identified original flow,
after outputting the instruction, determine whether a packet flow quantity of the first flow decrease, and
when the packet flow quantity does not decrease, release the instruction and identify another original flow of the first flow on the basis of the relation information.

2. The communication control device according to claim 1, wherein the congested state is a state in which a packet quantity included in the output queue of the first port is no less than a threshold value.

3. The communication control device according to claim 1, wherein the generation includes associating a second flow regarding a second packet inputted through a second port related to an output port of a third packet included in a third flow with the third flow, first time related to input of the second packet and second time related to input of the third flow satisfying a specific condition.

4. The communication control device according to claim 3, wherein the second port is identical to the output port of the third packet or is a port connected to a VNF connected to the output port of the third packet.

5. The communication control device according to claim 3, wherein the associating is performed on the basis of a similarity between header information of the third packet and information included in a beginning of a payload of the second packet.

6. The communication control device according to claim 1, wherein the original flow is a flow including an outside flow of a physical port.

7. The communication control device according to claim 1, wherein the packet is an initial packet in the one of flows.

8. A computer-implemented communication control method comprising:
generating relation information indicating relations among flows on the basis of log information indicating an input port through which a packet included in one of the flows are inputted, an output port through which the packet is outputted, and time related to input of the packet;
when a first port is in a congested state, identifying, in accordance with the relation information, an original flow on which a first flow is based, the first flow regarding a first packet included in an output queue of the first port;
outputting an instruction for suspending transmission of a packet regarding the identified original flow;
after outputting the instruction, determining whether a packet flow quantity of the first flow decrease; and
when the packet flow quantity does not decrease, releasing the instruction and identifying another original flow of the first flow on the basis of the relation information.

9. The communication control method according to claim 8, wherein the congested state is a state in which a packet quantity included in the output queue of the first port is no less than a threshold value.

10. The communication control method according to claim 8, wherein the generating includes associating a second flow regarding a second packet inputted through a second port related to an output port of a third packet included in a third flow with the third flow, first time related to input of the second packet and second time related to input of the third flow satisfying a specific condition.

11. The communication control method according to claim 10, wherein the second port is identical to the output port of the third packet or is a port connected to a VNF connected to the output port of the third packet.

12. The communication control method according to claim 10, wherein the associating is performed on the basis of a similarity between header information of the third packet and information included in a beginning of a payload of the second packet.

13. The communication control method according to claim 8, wherein the original flow is a flow including an outside flow of a physical port.

14. A non-transitory computer-readable medium storing communication control instructions executable by one or more computer, the communication control instructions comprising:
one or more instructions for generating relation information indicating relations among flows on the basis of log information indicating an input port through which a packet included in one of the flows are inputted, an output port through which the packet is outputted, and time related to input of the packet;
one or more instructions for identifying, when a first port is in a congested state, in accordance with the relation information, an original flow on which a first flow is based, the first flow regarding a first packet included in an output queue of the first port;
one or more instructions for outputting an instruction for suspending transmission of a packet regarding the identified original flow;
one or more instructions for after outputting the instruction, determining whether a packet flow quantity of the first flow decrease; and
one or more instructions for when the packet flow quantity does not decrease, releasing the instruction and identifying another original flow of the first flow on the basis of the relation information.

* * * * *